US012587990B2

(12) United States Patent
Wiacek et al.

(10) Patent No.: US 12,587,990 B2
(45) Date of Patent: Mar. 24, 2026

(54) METHODS AND APPARATUSES FOR ZERO TRUST CELL BROADCASTS

(71) Applicant: Nokia Technologies Oy, Espoo (FI)

(72) Inventors: Fabian Wiacek, Wroclaw (PL); Kamil Bechta, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 377 days.

(21) Appl. No.: 18/253,727

(22) PCT Filed: Dec. 1, 2021

(86) PCT No.: PCT/IB2021/061189
§ 371 (c)(1),
(2) Date: May 19, 2023

(87) PCT Pub. No.: WO2022/118219
PCT Pub. Date: Jun. 9, 2022

(65) Prior Publication Data
US 2024/0015684 A1 Jan. 11, 2024

Related U.S. Application Data

(60) Provisional application No. 63/121,433, filed on Dec. 4, 2020.

(51) Int. Cl.
*H04W 60/04* (2009.01)
*H04W 12/0431* (2021.01)
(Continued)

(52) U.S. Cl.
CPC ....... *H04W 60/04* (2013.01); *H04W 12/0431* (2021.01); *H04W 12/06* (2013.01); *H04W 76/20* (2018.02)

(58) Field of Classification Search
CPC . H04W 60/04; H04W 76/20; H04W 12/0431; H04W 12/06; H04W 12/122; H04W 48/08
See application file for complete search history.

(56) References Cited

U.S. PATENT DOCUMENTS

2008/0294560 A1* 11/2008 Holtmanns ............. H04L 63/06
705/51
2015/0208327 A1* 7/2015 Baratam ................ H04W 48/16
455/432.1
(Continued)

OTHER PUBLICATIONS

3GPP TS 38.331 version 16.2.0 Release 16 (Year: 2020).*
(Continued)

*Primary Examiner* — Rebecca E Song
*Assistant Examiner* — Shu Liu
(74) *Attorney, Agent, or Firm* — Barta Jones, PLLC

(57) ABSTRACT

Systems, methods, apparatuses, and computer program products for providing cell configuration parameters in a secure manner are provided. A method may include providing, from a network node, cell configuration or other cell sensitive data to the internal memory of an authorized user equipment. For example, the providing may include providing the cell configuration or other cell sensitive data to the memory of the authorized user equipment as coded cell configuration package (CCCP) tracking area update (TAU) data during the configuration of the authorized user equipment or while the authorized user equipment is in radio resource control (RRC) connected state with the network node.

3 Claims, 8 Drawing Sheets

Providing cell configuration data or parameters to a UE

1100

Sending cellular configuration signals that may include false or missing parameters

1105

(51) Int. Cl.
 *H04W 12/06* (2021.01)
 *H04W 76/20* (2018.01)

(56) References Cited

U.S. PATENT DOCUMENTS

| 2017/0374608 A1* | 12/2017 | Li | H04W 48/16 |
| 2021/0119727 A1* | 4/2021 | Chen | H04L 1/0045 |
| 2024/0114337 A1* | 4/2024 | Rajadurai | H04W 12/06 |

OTHER PUBLICATIONS

Office action received for corresponding European Patent Application No. 21820710.8, dated May 27, 2025, 3 pages.
"5G; NR; Base Station (BS) radio transmission and reception (3GPP TS 38.104 version 16.4.0 Release 16)", ETSI TS 138 104, V16.4.0, Jul. 2020, 267 pages.
"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.
"Electromagnetic warfare", Wikipedia, Retrieved on Jun. 15, 2023, Webpage available at : https://en.wikipedia.org/wiki/Electromagnetic_warfare.
"Signals intelligence", Wikipedia, Retrieved on Jun. 15, 2023, Webpage available at : https://en.wikipedia.org/wiki/Signals_intelligence.
"Electronic countermeasure", Wikipedia, Retrieved on Jun. 15, 2023, Webpage available at : https://en.wikipedia.org/wiki/Electronic_countermeasure.
"3rd Generation Partnership Project; Technical Specification Group Radio Access Network; Evolved Universal Terrestrial Radio Access (E-UTRA); Physical channels and modulation (Release 16)", 3GPP TS 36.211, V16.3.0, Sep. 2020, pp. 1-249.
"DOD Announces $600 Million for 5G Experimentation and Testing at Five Installations", US Department of Defense, Retrieved on Jun. 15, 2023, Webpage available at : https://www.defense.gov/News/Releases/Release/Article/2376743/dod-announces-600-million-for-5g-experimentation-and-testing-at-five-installati/.
International Search Report and Written Opinion received for corresponding Patent Cooperation Treaty Application No. PCT/IB2021/061189, dated Feb. 9, 2022, 11 pages.
"3rd Generation Partnership Project; Technical Specification Group Services and System Aspects Study on 5G Security Enhancement against False Base Stations (FBS) (Release 17)", 3GPP TR 33.809, V0.12.0, Nov. 2020, pp. 1-99.
"pCR: Evaluation for Solution#14", 3GPP TSG-SA WG3 Meeting #96adhoc, S3-193500, Agenda: 5.5, Apple, Oct. 14-18, 2019, 2 pages.
"Updates to Solution#7 on Verification of Authenticity of the cell", 3GPP TSG-SA WG3 Meeting #96, S3-192585, Agenda: 8.7, Nokia, Aug. 26-30, 2019, 7 pages.

* cited by examiner

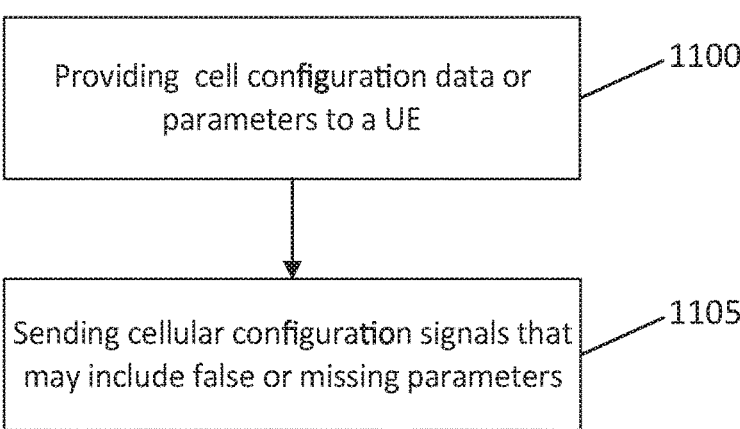

Providing cell configuration data or parameters to a UE ⟋1100

Sending cellular configuration signals that may include false or missing parameters ⟋1105

FIG. 10A

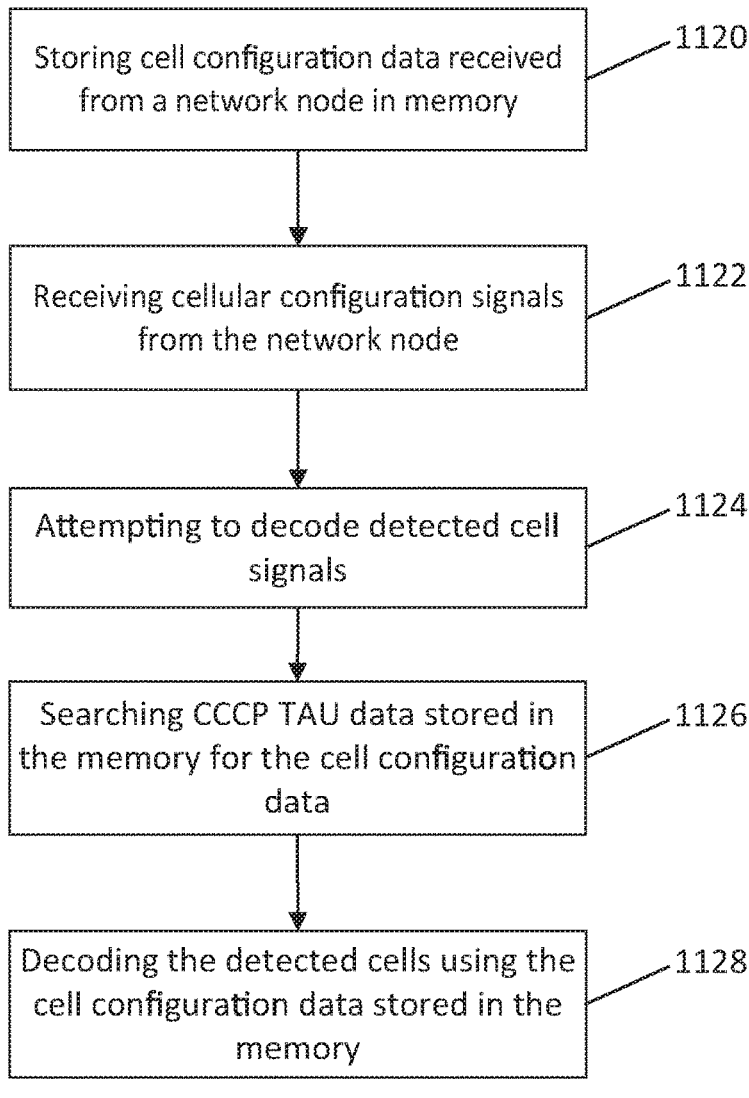

Storing cell configuration data received from a network node in memory ⟋1120

Receiving cellular configuration signals from the network node ⟋1122

Attempting to decode detected cell signals ⟋1124

Searching CCCP TAU data stored in the memory for the cell configuration data ⟋1126

Decoding the detected cells using the cell configuration data stored in the memory ⟋1128

FIG. 10B

METHODS AND APPARATUSES FOR ZERO TRUST CELL BROADCASTS

RELATED APPLICATION

This application claims priority to PCT Application No. PCT/IB2021/061189, filed on Dec. 1, 2021, which claims priority to U.S. Provisional Application No. 63/121,433, filed on Dec. 4, 2020, each of which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment is directed to a method that may include providing, from a network node, cell configuration or other cell sensitive data to an authorized user equipment. The providing may include providing the cell configuration or other cell sensitive data to a memory of the authorized user equipment as coded cell configuration package (CCCP) tracking area update (TAU) data during configuration of the authorized user equipment or while the authorized user equipment is in radio resource control connected state with the network node.

An embodiment is directed to a method that may include storing cell configuration or other cell sensitive data received from a network node in a memory of an authorized user equipment as coded cell configuration package (CCCP) tracking area update (TAU) data. The storing may include storing the cell configuration or other cell sensitive data as coded cell configuration package (CCCP) tracking area update (TAU) data during configuration of the authorized user equipment or while the authorized user equipment is in radio resource control connected state with the network node.

An embodiment may be directed to an apparatus including at least one processor and at least one memory comprising computer program code. The at least one memory and computer program code may be configured, with the at least one processor, to cause the apparatus at least to provide cell configuration or other cell sensitive data to an authorized user equipment. In order to provide the cell configuration or other cell sensitive data, the at least one memory and computer program code may be configured, with the at least one processor, to cause the apparatus to provide the cell configuration or other cell sensitive data to a memory of the authorized user equipment as coded cell configuration package (CCCP) tracking area update (TAU) data during configuration of the authorized user equipment or while the authorized user equipment is in radio resource control connected state with the apparatus.

An embodiment may be directed to an apparatus including at least one processor and at least one memory comprising computer program code. The at least one memory and computer program code configured, with the at least one processor, to cause the apparatus at least to store cell configuration or other cell sensitive data received from a network node in a memory of an authorized user equipment as coded cell configuration package (CCCP) tracking area update (TAU) data. In order to store the cell configuration or other cell sensitive data, the at least one memory and computer program code may be configured, with the at least one processor, to cause the apparatus to store the cell configuration or other cell sensitive data as coded cell configuration package (CCCP) tracking area update (TAU) data during configuration of the authorized user equipment or while the authorized user equipment is in radio resource control connected state with the network node.

An embodiment may be directed to an apparatus that may include means for providing cell configuration or other cell sensitive data to an authorized user equipment. The means for providing may include means for providing the cell configuration or other cell sensitive data to a memory of the authorized user equipment as coded cell configuration package (CCCP) tracking area update (TAU) data during configuration of the authorized user equipment or while the authorized user equipment is in radio resource control connected state with the apparatus.

An embodiment may be directed to an apparatus that may include means for storing cell configuration or other cell sensitive data received from a network node in a memory of an authorized user equipment as coded cell configuration package (CCCP) tracking area update (TAU) data. The means for storing may include means for storing the cell configuration or other cell sensitive data as coded cell configuration package (CCCP) tracking area update (TAU) data during configuration of the authorized user equipment or while the authorized user equipment is in radio resource control connected state with the network node.

BRIEF DESCRIPTION OF THE DRAWINGS

For proper understanding of example embodiments, reference should be made to the accompanying drawings, wherein:

FIG. 10A illustrates an example flow diagram of a method, according to an embodiment;

FIG. 10B illustrates an example flow diagram of a method, according to an embodiment;

DETAILED DESCRIPTION

Figure 1:
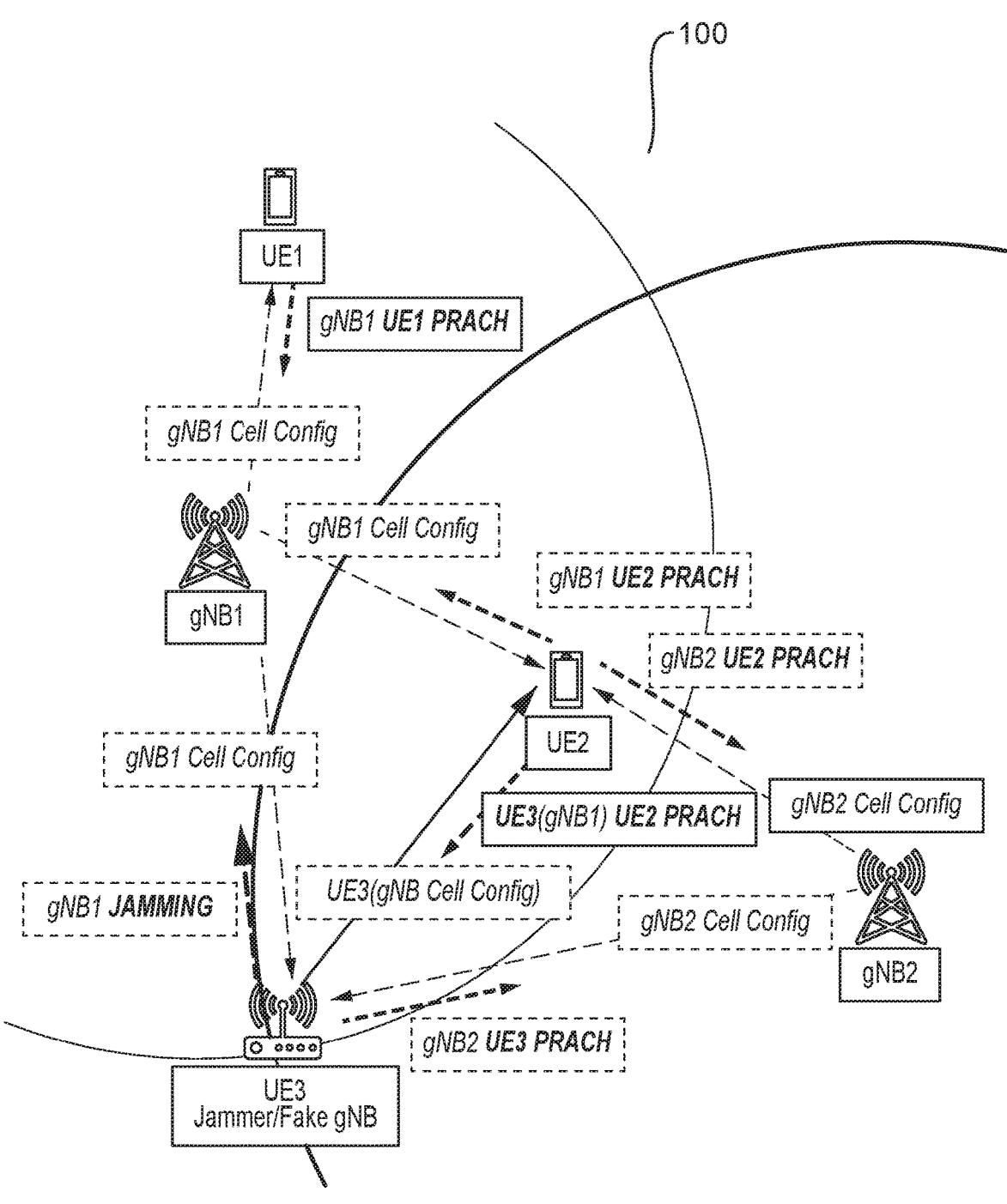
FIG. 1 illustrates an example of a system, according to an embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for securely providing cell configuration parameters, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

As will be discussed in detail herein, some example embodiments may related to methods for zero trust cell broadcasts that, for instance, can enhance 5G or LTE base station security.

According to the $3^{rd}$ generation partnership project (3GPP) 5G and LTE standards, a cell may broadcast and transmit the cell parameters that may be required for any UE in the cell coverage for radio resource control (RRC) connection establishment, at least for emergency connection purposes. Consequently, the cell may be considered an easy target for any kind of jamming. This risk may be especially problematic in case of government and military applications, which may use 5G or LTE as private networks. In this context, 5G connections could be subject to jamming or smart jamming, e.g., if a hostile party would like to degrade or cease communications between authorized users or to intercept connections via fake base stations, which may pretend to be part of authorized infrastructure. For example, a typical specific risk for government or military LTE/5G applications may include that LTE/5G communication nodes may be subjects of electronic warfare, which may include signal intelligence and electronics countermeasure.

Considering cell configuration parameters, it may be specified that some parameters may be considered as static, such as system bandwidth, or as dynamic, such as system frame number. Also, some cell parameters may be measured independently, e.g., by a spectrum analyzer.

A cell search procedure (for LTE/5G) may include the following steps: (a) frequency acquisition, (b) primary synchronization signal (PSS) acquisition (slot timing, secondary synchronization signal scrambling code, cell number), (c) secondary synchronization signal (SSS) acquisition (frame timing, cell group ID sequence), (d) with PSS and SSS, physical cell ID (PCI) may be calculated, (e) with PCI, reference signal (RS) location may be detected, (f) with the help of the reference signal, physical broadcast channel (PBCH) used to broadcast master information block (MIB) can be detected, (g) from MIB, system frame number (SFN) and system bandwidth may be detected, (h) decode physical control format indication channel (PCFICH) and detect how many symbols are allocated for physical downlink control channel (PDCCH), (i) decode downlink control information (DCI) for system information block 1 (SIB1) from PDCCH, (j) decode SIB1 and get the scheduling information for other SIBs, and (k) decode SIBs (other than SIB1, e.g., SIB2 for random access channel (RACH) parameters). The Cell Search Procedure may have a clearly defined order, which define parameters dependency. Some cell parameters may be derived from preceding ones.

According to 3GPP LTE/5G standards, one or more of the following cell specific parameters may be transmitted or broadcasted by the given cell in order to enable connection with the network. Cell parameters may have static or dynamic character and different specific values ranges. For example:

1. From PSS:
    1.1 Cell Number—static parameter
2. From SSS:
    2.1 Cell Group Number—static parameter
3. From MIB
    3.1 System Bandwidth—static parameter
    3.2 PHICH Information—static parameter
    3.3 System Frame Number SFN—dynamic parameter
4. From SIB1:
    4.1 PLMN Identity List—static parameter
    4.2 Tracking Area Code—static parameter
    4.3 Cell Identity—static parameter
    4.4 Cell Barred—static parameter 5. From SIB2:

5.1 AC Barring for Emergency—static parameter 5.2 RACH Config Common—static parameter 5.3 BCCH Config—static parameter 5G and LTE cells, irrespective of applications, may broadcast or transmit all of the cell parameters required for establishing a RRC connection. This, however, also means that any potential unauthorized or even hostile user may use its UE to disturb connections or to intercept connections between authorized users and their UE. For instance, for high safety and security oriented 5G or LTE applications, a problem arises in that the cell openly shares essential information which could be used against this infrastructure.

As an example, the cell may broadcast in MIB cell bandwidth and, by PSS/SSS, a UE may be provided with information about the exact frequency used. Also, the cell may provide information about RACH parameters. Consequently, potential jamming may be effective since the frequency and bandwidth may be known. This in turn may mean that 5G/LTE infrastructure may be vulnerable to jamming or smart jamming attacks.

When considering strict military applications, such as operational communication on the battlefield, there may be significant risk that 5G/LTE communication channel may be relatively easily blocked.

FIG. 1 illustrates an example of a safety and security related 5G/LTE private network communication system 100, according to an embodiment. In the example of FIG. 1, UE1 and UE2 may be authorized UEs, which may have access to both gNB1 and gNB2 cells for establishing connections or handovers. As illustrated in the example of FIG. 1, UE1 and/or UE2 may perform random access channel procedure by sending PRACH Msg1 towards the given cell, gNB1 or gNB2, which may trigger sending random access response Msg2. Access restrictions may be verified during a UE attach procedure, which is Msg3.

As also illustrated in the example of FIG. 1, at a given point in time, UE3 may be activated whose presence was not detected earlier. In the example of FIG. 1, the purpose of UE3 may be, depending on the application, to block or reduce nominal cell traffic quality both in uplink and downlink direction by narrowband targeted jamming for certain radio resources, as shown with respect to gNB1. Additionally or alternatively, the purpose of UE3 may be to act as a fake base station and in an unauthorized way intercept uplink and downlink traffic between authorized UE(s) and a network node, as shown in the case of gNB1 and UE2 due to higher signal power and possible jamming of real gNB1. Additionally or alternatively, the purpose of UE3 may be to act as a smart jammer and block RACH performance, as shown in the case of gNB2.

As explained and illustrated in FIG. 1, any potential hostile action against 5G/LTE safety and security private network, which may be related for example to government or military applications, can have significant impact on overall system performance. One problem includes that, by revealing all cell configuration in open way, UE3, which can be for example a high-power narrowband jammer, fake eNB or smart jammer, may be able to effectively attack 5G/LTE communication infrastructure. By reception of gNB1/gNB2 cell configuration, UE3 can determine orthogonal frequency division multiplex (OFDM) signal pattern, band, power, resource allocations, identity and many other cell essential parameters. As a result, it can use these parameters against the network. In other words, the provision of cell configuration parameters in plain form may be used in a hostile manner against the network.

Figure 2:
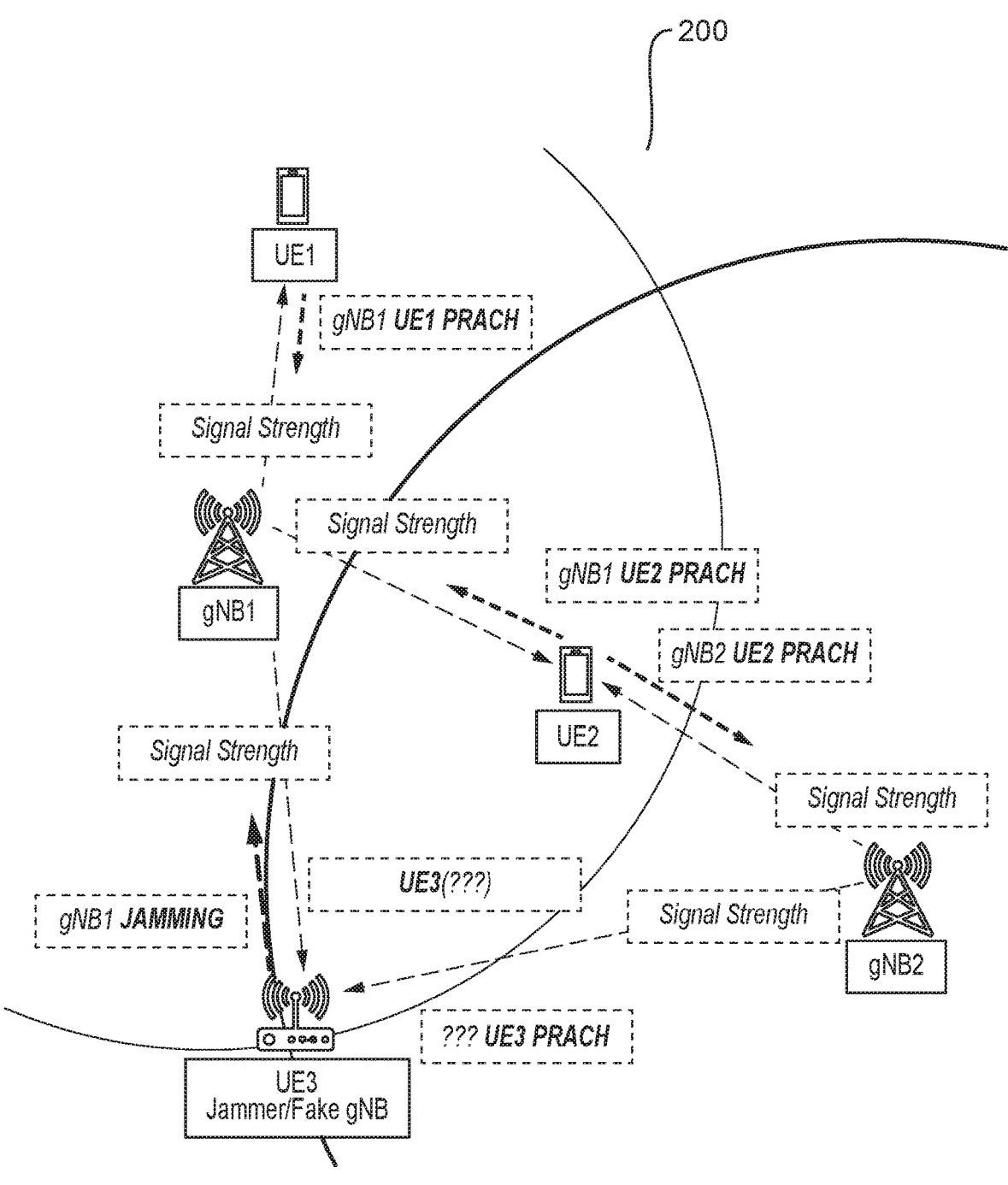
FIG. 2 illustrates an example of a system, according to an embodiment.

FIG. 2 illustrates an example system 200 depicting a safety and security related scenario, according to one example embodiment. In the example of FIG. 2, base stations gNB1 and gNB2 do not reveal cell configurations in broadcasts or synchronization transmissions or provide them in misleading or coded form. Rather, the authorized UEs, i.e., UE1 and UE2 in the example of FIG. 2, may be aware of such base station behaviour and may be able to obtain this data from its internal memory or such data may be delivered in coded form while the UE was in the coverage area of another authorized base station.

It is noted that security aspects of 5G/LTE applications may refer to technical protections, e.g., the ability to prevent from eavesdropping or connection interception, whereas safety aspects may be related to user safety if a security breach occurs, e.g., a UE position disclosure to unauthorized recipient.

As illustrated in the example of FIG. 2, UE3 may have limited abilities to disrupt 5G/LTE communications or to intercept data, as gNB1 and gNB2 cell data may not be revealed or may have incorrect values. In this case, jamming may be less effective as exact OFDM signal structure, bands, resources allocation, etc. may not be precisely specified, which may mean that the jammer needs to use wideband jamming or needs to assume certain transmissions patterns. Additionally, acting as a fake base station may not be effective as UE3 may not be able to use correct cell configuration settings from received broadcasts or synchronization transmissions. Further, UE3 may not be able to initiate RACH as RACH cell configuration may not be provided.

Therefore, if UE3 may not be aware about exact cell configuration or pattern used, the only way to disrupt communications may be to apply a trial and error approach, in which UE3 may to guess proper cell configuration, which may be time consuming and in turn prevents the rapid occurrence of safety and security breach and also may provide time for UE3 neutralization.

Under the example of FIG. 2, UE3 may be able detect the given signal cell strength and initiate a cell search procedure, but this will fail at the decoding stage (b), as explained above in with respect to LTE/5G cell search procedure, or it may depend on applied strategy related to revealing of cell parameters.

Figures 3, 4:
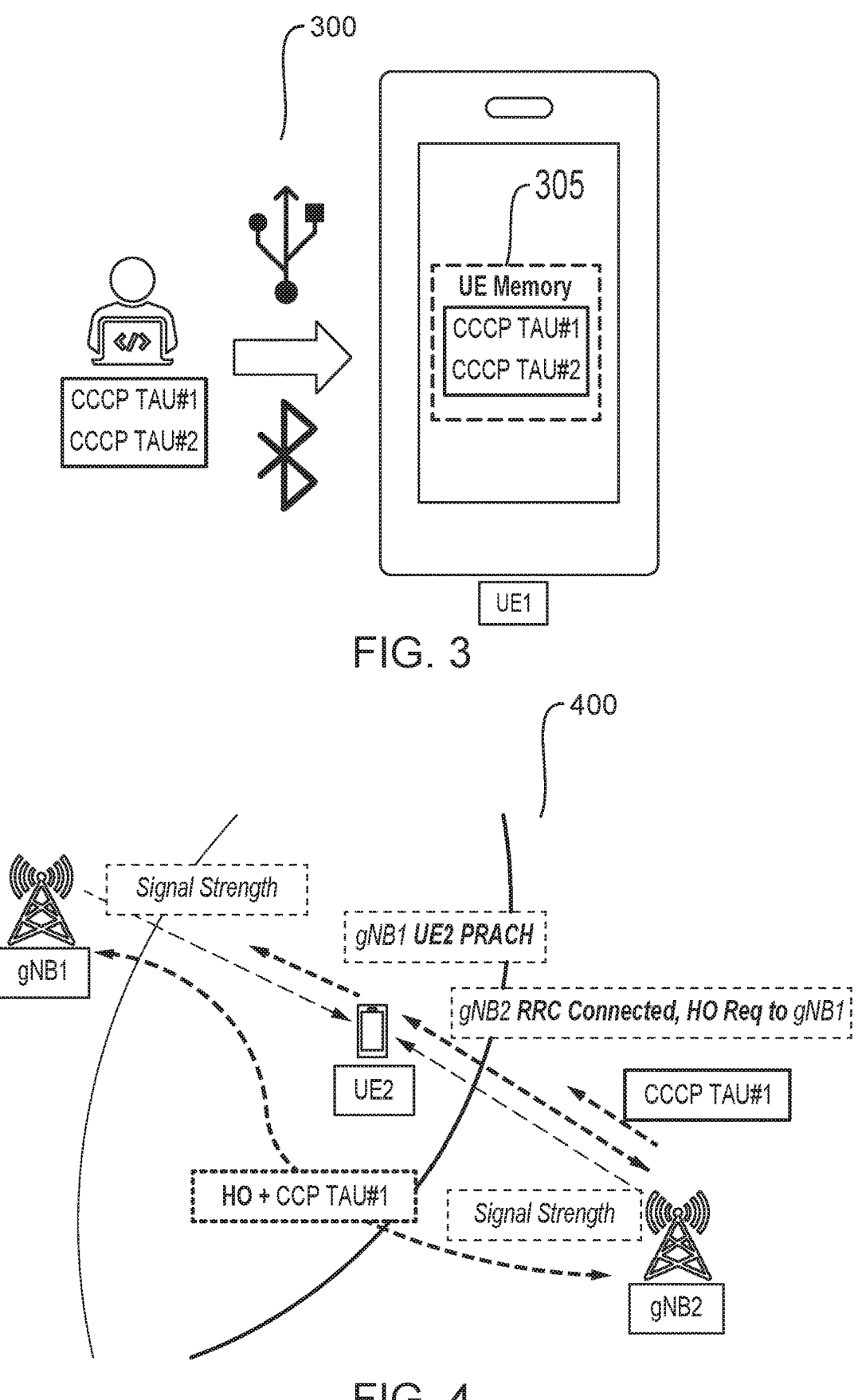
FIG. 3 illustrates an example of a system, according to an embodiment.
FIG. 4 illustrates an example of a system, according to an embodiment.

In this context, example embodiments can improve safety and security aspects of 5G and LTE communications by not revealing cell configuration or other cell sensitive data via broadcasts or transmissions. Cell configuration or other cell sensitive data may be delivered to an authorized UE in a safe and secure way, for example, by direct provision to the authorized UE internal memory as a coded cell configuration package (CCCP) compliant with tracking area update (TAU) during UE configuration by the authorized service for given operational conditions, as illustrated in FIG. 3 discussed below. Association with TAU means that the authorized UE may receive CCCP data for all neighbour cells. Alternatively or additionally, Cell configuration or other cell sensitive data may be delivered to an authorized UE, for example, by provision to the authorized UE internal memory as CCCP compliant with TAU while the authorized UE is in RRC Connected state with an authorized base station, which may mean that delivered CCCP content can be securely encrypted, as illustrated in the example of FIG. 4 discussed below.

Considering that cell configuration may contain static and dynamic parameters, this data may be stored in CCCP TAU in different forms. As an example, static cell data in CCCP TAU may be stored in direct and/or in coded form. As a further example, dynamic cell data in CCCP TAU may be stored as offset and/or in coded form.

In the example of FIG. 2, according to an embodiment, the authorized base stations gNB1 and gNB2 may broadcast in MIB/SIBs or transmit in PSS/SSS misleading cell static parameters or such parameters may not be present, and/or may apply the same offset to dynamic cell parameters. A regular UE may not be able to set this cell as the suitable or active cell due to failure of cell configuration decoding and, therefore, such a UE may select another cell for connection. By doing so, downlink synchronization may be maintained and any potential hostile UE, e.g. UE3, may be provided with false data.

FIG. 3 illustrates an example of a process 300 for an authorized operator's service to provide or download the most up to date CCCP TAU related data to the internal memory 305 of an authorized UE, according to an example embodiment. For example, in some embodiments, the CCCP TAU data can be provided or downloaded via Bluetooth connection or USB, or the like. This example process 300 can prevent eavesdropping or interception of data or parameters, such as cellular configuration information or other cell sensitive data. As one example, the approach illustrated in the example of FIG. 3 may be used in the case of UE1 illustrated in the example of FIG. 2. For instance, UE1 may detect strong cell signals at the given frequency but may not be able to decode it directly. UE1 may then search CCCP TAU data (CCCP TAU #1, CCCP TAU #2) stored in its memory 305 and link the frequency with associated gNB1 set of cell configuration parameters. Then, for example, CCCP TAU #1 for gNB1 may be decoded, which may enable RRC Connection of UE1. However, a hostile UE, such as UE3 in the examples of FIG. 1 or FIG. 2, would not be able to obtain CCCP TAU data this way.

FIG. 4 illustrates an example system 400 in which the most up to date CCCP TAU related data may be delivered to an authorized UE when it is in the RRC connected state, such that uplink and downlink transmissions can be integrity protected and encrypted. In the example of FIG. 4, UE2 may detect strong cell signals at a given frequency, which may trigger handover procedure. UE2 may report measurements to the gNB2 still being in RRC connected state. The base station gNB2 may be able to determine to which neighbour cell UE2 will initiate handover procedure and may request that gNB1 to provide the most up to date CCCP TAU #1 data. Then, gNB2 may provide this data over radio interface to UE2 in protected and encrypted form. Thus, even if transmitted CCCP TAU #1 were to be intercepted, UE3 would not be able to decode it.

In view of the above, certain example embodiments may enable secure delivery of CCCP TAU data to an authorized UE's internal memory, which may contain the cell configuration data required for establishing RRC connection. Thus, a base station does not need to transmit the cell configuration parameters in a plain way by MIB/SIBs broadcasts or PSS/SSS synchronization transmissions, thereby improving the base station resistance for potential hostile jamming, fake base station or unauthorized access, for example, in 5G/LTE applications where safety and security aspects may have priority. As an outcome, broadcasts or synchronization transmissions from a base station applying example embodiments for maintaining and distributing cell configuration parameters may be denoted as zero trust cell broadcasts.

Figure 5:
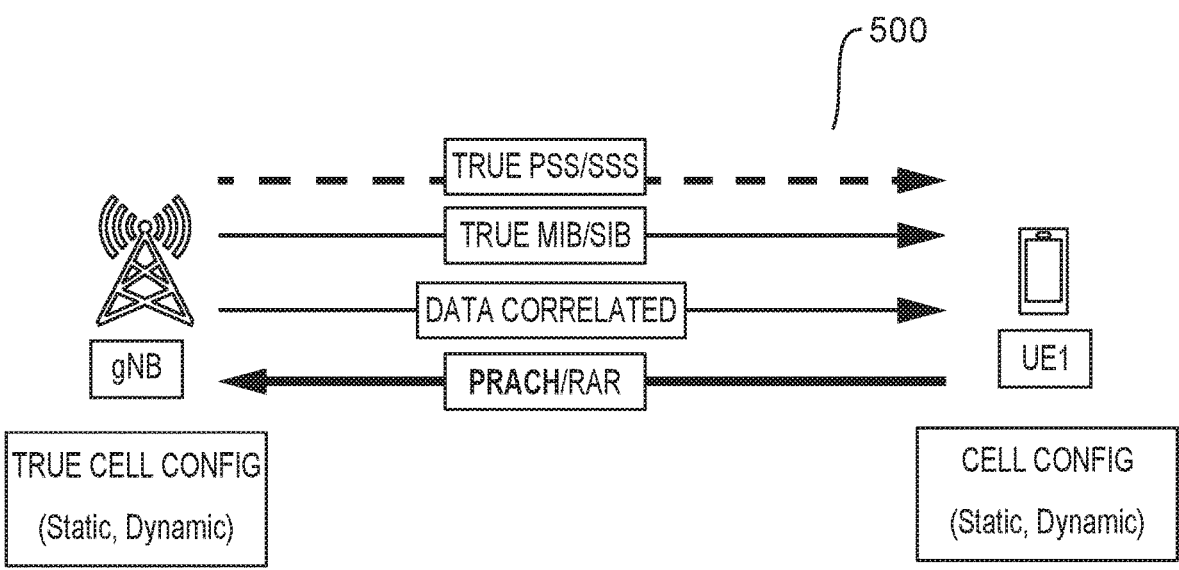
FIG. 5 illustrates an example of a signaling diagram, according to an embodiment.

FIGS. 5-8, as will be discussed in the following, illustrate example ways for handling different types of UEs that may be in a given cell coverage, according to certain example embodiments. FIG. 5 illustrates an example of a signaling diagram 500 that may correspond to that shown at FIG. 1, in which UE1 may be a regular UE that is in the coverage area of a base station gNB1. The base station (gNB) in the example of FIG. 5 may operate with one set of cell parameters (True Cell Config). This cell configuration may be then signaled to UE1 over the radio interface and may enable correct data detection. In the example of FIG. 5, UE1 may receive cell configuration and decode it both for static and dynamic parameters. Then, if required, RRC connection may be initiated (PRACH), for which the base station may send a random access response (RAR).

Figure 6:
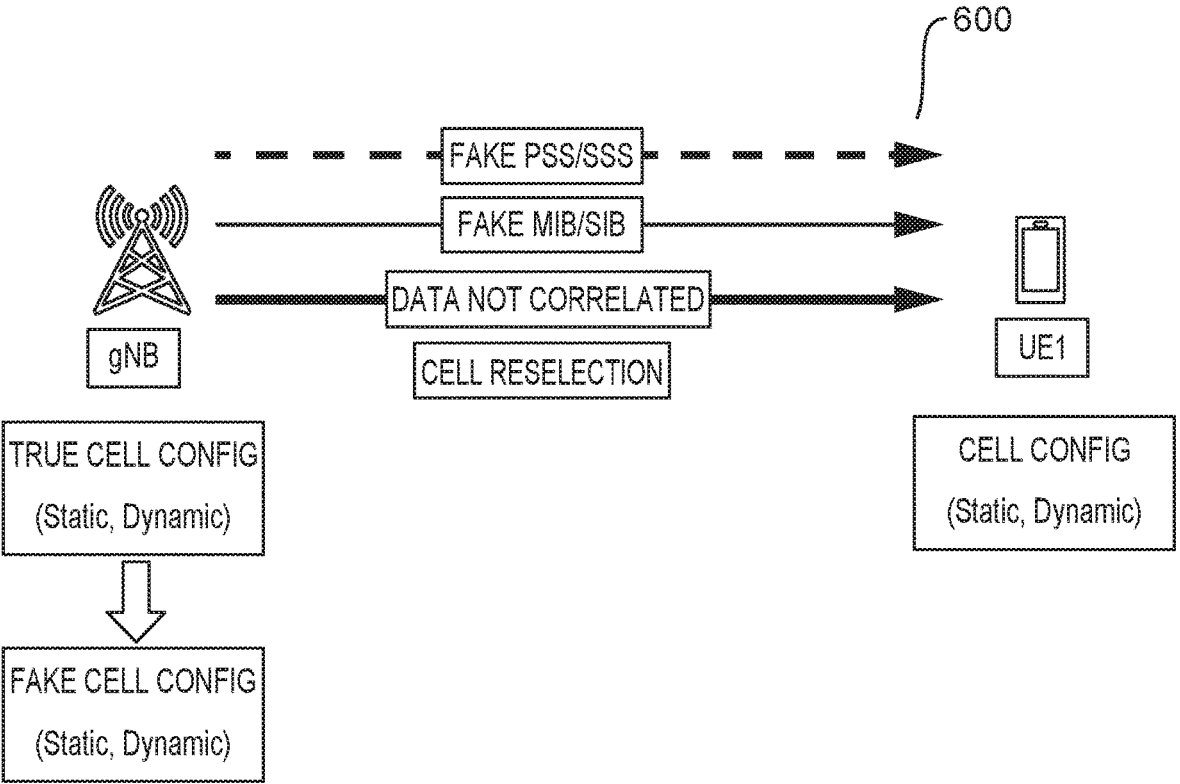
FIG. 6 illustrates an example of a signaling diagram, according to an embodiment.

FIG. 6 illustrates an example of a signaling diagram that may correspond to that shown at FIG. 2, in which UE1 may be a regular UE that is in the coverage area of base station gNB1, according to one embodiment. In the example of FIG. 6, the base station (gNB) may operate with two sets of cell parameters (True Cell Config, Fake Cell Config). The Fake configuration may be applied according to security levels to PSS/SSS, MIB/SIBs or SIB2 RACH configuration. In an embodiment, a data structure that refers to a data resource allocation may correspond to the True Cell Configuration, which means that there is no relation between broadcasted MIB/SIBs data and synchronized transmission PSS/SSS that depends on the security level applied. In the example of FIG. 6, the UE1 may receive this data and, based on the fake values, may try to decode the received data. It may be assumed that such attempts may fail and, according to standard cell search procedure, the UE1 may reject this cell as not being a suitable cell or active cell for emergency connections and may select another cell for possible connection.

According to some example embodiments, it may be assumed that safety and security related 5G/LTE private networks ensure that each UE may be handled but differently (general or guest-like access). In this context, UE1 may be handled by another cell, which may cover the same area as illustrated in FIG. 1 and/or FIG. 5.

Figure 7:
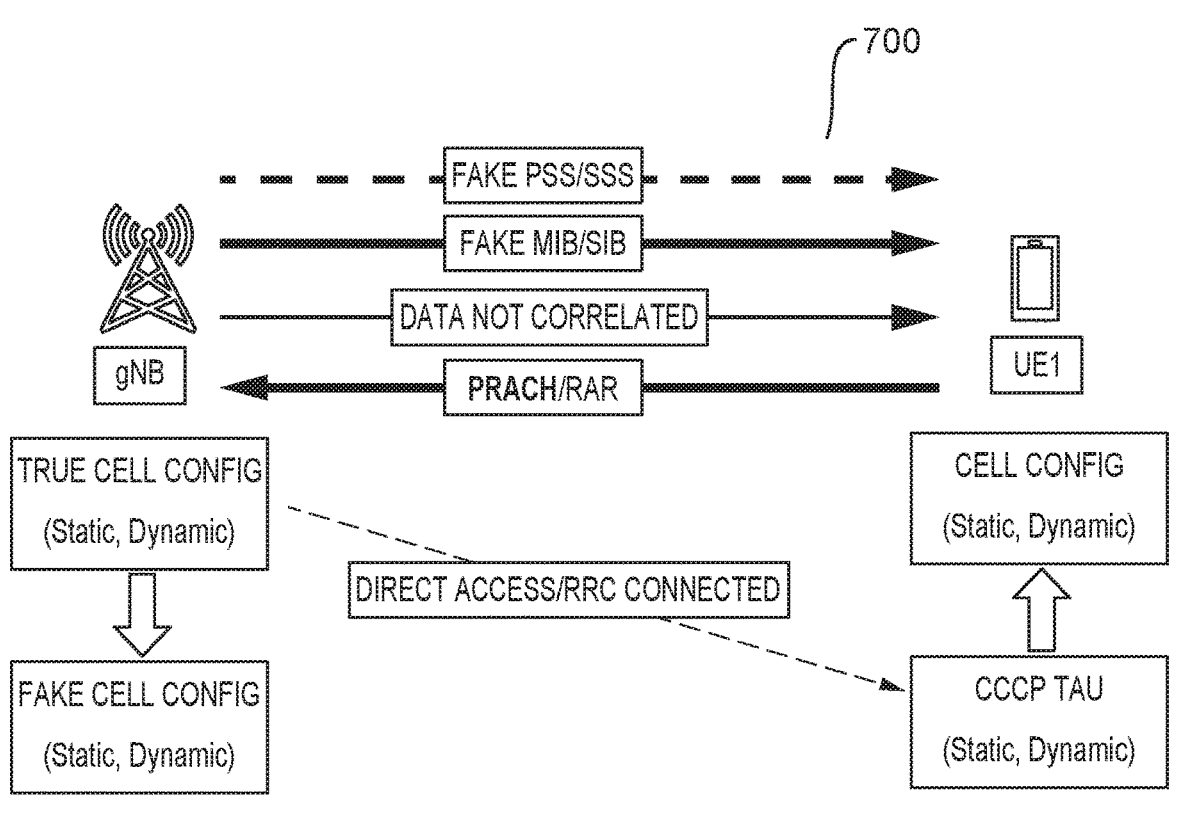
FIG. 7 illustrates an example of a signaling diagram, according to an embodiment.

FIG. 7 illustrates an example of a signaling diagram 700 that may correspond to that shown at FIG. 2, in which UE1 may be an authorized UE that may be in the coverage area of a base station gNB1, according to one embodiment. In the example of FIG. 7, the base station (gNB) may operate with two sets of cell parameters (True Cell Config, Fake Cell Config). The Fake configuration may be applied according to security levels to PSS/SSS, MIB/SIBs or SIB2 RACH configuration. In an embodiment, a data structure that refers to data resource allocation may correspond to the True Cell Configuration, which may mean that there is no relation between broadcasted MIB/SIBs data and synchronized transmission PSS/SSS that depends on the security level applied. The authorized UE may store CCCP TAU data, which may be used with priority to supplement, replace or offset Cell Configuration (Fake) received from the given base station. In this case, even if PSS/SSS, MIB/SIBs/SIB2 RACH Channel Configuration may not be correctly detected or may have values that may not be trusted, the UE still may be able to determine its correct values by merging both data, as shown in Table 1 and Table 2 depicted below. In this context, even if gNB1 does not provide the required parameters for connection data, the authorized UE may be able to establish RRC connection.

According to certain embodiments, CCCP TAU data may be delivered to the authorized UE by direct access to the given UE, e.g., as discussed in connection with FIG. 3, for example by memory stick or USB, or by wireless technology such as Wi-Fi, LTE or Bluetooth, or while the authorized UE is in RRC Connected State, such as due to handover procedure, as illustrated in FIG. 4. CCCP TAU data may be also delivered by other cells, e.g., as shown in FIG. 1, where gNB1 may act as 5G general access cell or by other different access technologies, such as Wi-Fi or LTE.

Figure 8:
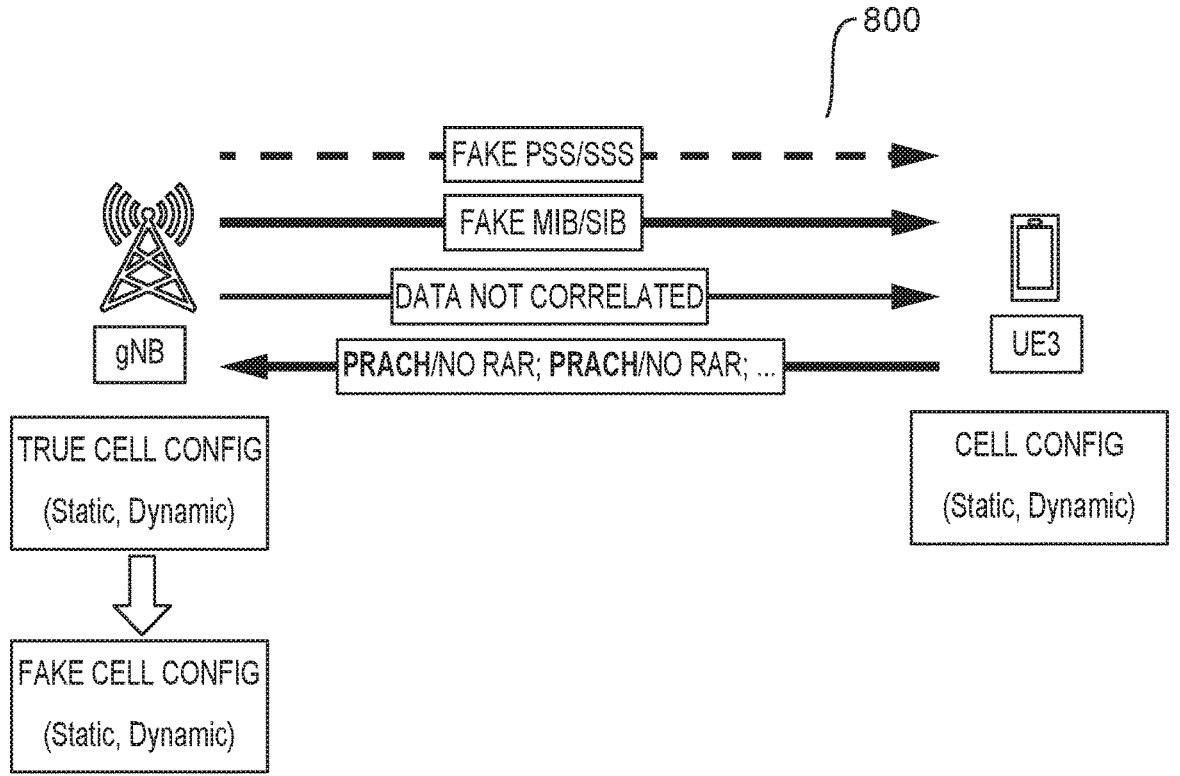
FIG. 8 illustrates an example of a signaling diagram, according to an embodiment.

FIG. 8 illustrates an example of a signaling diagram 800 that may correspond to that shown in FIG. 2, in which UE3 may be a hostile UE that is in the coverage area of base station gNB1, according to one embodiment. In the example of FIG. 8, the base station (gNB) may operate with two sets of cell parameters (True Cell Config, Fake Cell Config). The Fake configuration may be applied according to security levels to PSS/SSS, MIB/SIBs or SIB2 RACH configuration. In an embodiment, a data structure that refers to data resource allocation may correspond to the True Cell Configuration, which may mean that there is no relation between broadcasted MIB/SIBs data and synchronized transmission PSS/SSS that depends on the security level applied. The hostile UE3 may not be aware about security related enhancements and/or may not be provided with information on which parameter is altered or misleading, whereas missing parameters may be identified. In such a case, the hostile UE3 may attempt to apply a trial and error approach in order to determine the correct cell configuration. This operation may be characterized by the time needed to determine the correct configuration determination $DT_{SL}$ according to [Eq. 2] and associated probability of success $DP_{SL}$ according to [Eq. 3], as discussed below.

It may be anticipated that significant number of incorrect PRACHs may be received from the hostile UE when a trial and error approach is used. Reception of such incorrect PRACHs may be used, in turn, to determine whether a potential attack is or will be occurring.

As explained with respect to 3GPP 5G/LTE cell search procedure, according to LTE 3GPP TS 138.104 section 5.4.3.3 or 5G 3GPP TS 38.300 section 5.2.5.3, a UE may scan supported frequency bands and may select the strongest cell signal based on signal power measurement. Then, the UE may try to decode PSS and SSS synchronization signals. After that, MIB and SIB, especially SIB1 scope may be correctly decoded. Finally, SIB2 contain RACH channel details, which may be required for initialization of Random Access Channel Procedure by sending PRACH.

However, if a UE fails to decode broadcast content or may not be able to decode information from synchronization transmissions, it may reject such cell and select another one, if possible. In this context, the scope of Coded Cell Configuration Package may be organized in three (3) CCCP Layers with same priority, namely: (1) PSS/SSS, (2) MIB/SIBs, (3) RACH Configuration (SIB2).

If some cell configuration parameter may be missing or may have misleading character at PSS/SSS level, further decoding of MIB/SIBs, especially SIB1 may not be possible. SIB1 provides information required for access to other SIBs, such as the given SIB periodicity.

As an example, if signaled in MIB System bandwidth (BW) value is altered, e.g., according to Table 1, 2, a regular UE may not be able to correctly decode SIBs content, thus cell search procedure may be aborted. System BW, in LTE may have 6 values, which may be easily determined by the hostile UE based on spectrum analysis, but it may be sufficient for preventing connection from regular UEs.

In this context, an alteration or change at PSS/SSS and MIB/SIBs (SIB1) level may lead to aborting of the cell search procedure. For example, if some cell configuration parameter(s) may be missing or may have misleading character at MIB/SIBs level, a UE may be able to decode Physical Cell Identifier (PCI) but may not be able to decode the other content, depending on which parameter may be missing or may have misleading character.

If RACH configuration, which is a part of SIB2 is not provided or may have misleading character, a UE may benefit from services provided in RRC Idle state, but it may not be possible to establish connection with the given cell. A similar situation may be when the scope of other SIBs, excluding SIB1 may be modified, as the provided information related to other services or functionalities available through the network.

For example, if in LTE, SIB16 content is modified, a UE may incorrectly determine GPS-based position, which for example may be shifted by a specific factor. This in turn may trigger other services, which may use GPS coordinates as a trigger, such as Area Based Services.

For LTE, SIBs may be organized as follows:
SIB 1: Cell Selection, Cell Access, SI Scheduling
SIB 2: RACH, Access Barring, UL frequency Information, MBSFN Config
SIB 3: Intra Frequency Cell Reselection
SIB 4: Intra Frequency Neighbour Cell
SIB 5: Inter Frequency Neighbour Cell
SIB 6: UTRAN Neighbour Cell
SIB 7: GERAN Neighbour Cell
SIB 8: CDMA Neighbour Cell
SIB 9: Home eNB Name for femtocell application
SIB 10/SIB11: ETWS
SIB 12: CMAS
SIB 14: Extended Access Barring
SIB 13/SIB 15/SIB 20: MBMS
SIB 16: GPS
SIB 17: WLAN
SIB 18/SIB 19/SIB 21: Sidelink
SIB 24: NR Neighbour Cell
For 5G, SIBs may be organized as follows:
SIB 1: Cell Selection, Cell Access, SI Scheduling, RACH
SIB 2: Cell Reselection Information Common for intra-frequency, inter-frequency and/or inter-RAT cell Reselections
SIB 3: Caries NR Intrafrequency Neighbor cell list and Reselection Criteria
SIB 4: Caries NR Interfrequency Neighbor cell list and Reselection Criteria
SIB 5: Caries EUTRA Neighbor cell list and Reselection Criteria
SIB 6: Carries ETWS
SIB 7: Carries ETWS Secondary Notification
SIB 8: Carries CMAS Notification
SIB 9: Carries GPS time and UTC (Coordinated Universal Time)

In this context, an alteration in SIBs, which may change values or content of a given parameter, may affect associated service or functionality performance. CCCP TAU data stored at the authorized UE internal memory or delivered to it while in RRC Connected state, may contain coded cell configuration parameters, both static and dynamic, which may be allocated to one, two or three layers respectively, which in turn may have impact on the strength of methods according to certain embodiments. It is noted that one or more parameters can be stored this way.

According to certain example embodiments, CCCP layers may provide at least three possible areas of application, e.g., in which different safety or security levels may be needed. For example, these security levels may include, but are not limited to, security level 1, security level 2, and/or security level 3.

In an embodiment, security level 3 may correspond to Layer 3 (RACH Configuration) and may be applied, for instance, in general 5G/LTE private networks to prevent from unauthorized access. Under security level 3, a regular UE may not be able to decode RACH Configuration from SIB2 so it may not initiate connection by sending PRACH to this cell; but other services available in RRC Idle state may be granted. According to security level 3, CCCP TAU may contain Layer 3 content. This solution should have no impact on other cells in the vicinity, since RACH configuration may be cell specific.

According to an embodiment, security level 2 may correspond to Layer 2 (MIB/SIBs) and may be applied, for example, in case of 5G/LTE safety and security related private networks application or for government applications. Under security level 2, the MIB/SIB content may not be correctly decoded by any regular or unauthorized UEs and hostile UEs may need to apply a trial and error approach to guess or predict the correct cell configuration. By applying security level 2, access to RRC Idle services may not be granted. According to security level 2, CCCP TAU may contain Layer 3 and Layer 2 content. This solution should have no impact on other cells in the vicinity, as MIB/SIBs content may be cell specific.

In an embodiment, security level 1 may correspond to Layer 1 (PSS/SSS) and may be applied, for example, in case of high security and safety related private networks, government and military applications. Under security level 1, The PSS/SSS scope may not be decoded or may provide misleading outcome value, which in turn prevents correct decoding of other cell parameters. As a result, such a cell may be rejected. However, if misleading data, e.g., PCI, is provided, there may be a risk that some neighbour cell may have the same PCI set and, therefore, there may be a risk of interferences. In such a case, a default PCI may be used across the network and a UE may determine correct PCI after association with the given detected signal frequency. According to security level 1, CCCP TAU may contain Layer 3, Layer 2 and/or Layer 1 content accordingly. This approach could have an impact on other cells in the vicinity due to possible PCI collision.

Depending on the CCCP Layer, a regular or unauthorized UE, including a hostile UE, may abort the cell search procedure at the given stage. This can be an acceptable solution as the authorized UE may have access to this cell by using CCCP TAU data stored inside its internal memory.

As illustrated in the example of FIG. 1 discussed above, cell configuration parameters broadcasted by the gNB1 could be intercepted by the jammer UE3, which may use this sensitive data against the base station. This may be referred to as smart jamming. For example, by knowing RACH configuration, the jammer may target these particular resource elements by transmission on many PRACHs. Thus, it may saturate the RACH receiver and prevent connection from the other UEs, such as UE1 or UE2. Another jamming option may be the usage of narrowband jamming, which may target the given control or user resource elements causing problems with detection or alter its values. This attack may also be successful as the base station may reveal which radio resources are used for control and which for user data. According to an embodiment, by not revealing this data, the hostile UE3 would need to determine these missing parameters by trial and error approach, which may be detected by the operator and prevented before the proper configuration can be detected by the hostile UE.

Another dangerous kind of attack against 5G/LTE infrastructure may be a situation in which a fake base station, e.g., UE3 in FIG. 1, may intercept broadcast and synchronous transmissions from the given base station, e.g., gNB1 in FIG. 1, and take advantage of higher transmission power for intercepting UEs, for example during handover, as illustrated for UE2. UE2 may have been provided with misleading data and may select the hostile UE3 as the target cell, which may be considered as a security breach. In a man-in-the-middle variant, the fake base station may act, for example, as a relay and may have impact on exchanged data between the authorized UE and the given base station. According to an embodiment, by not providing cell details, the fake base station may not be able to apply the correct cell configuration. If this fake base station uses freely transmitted data, an authorized UE may apply correct cell configuration, which in turn may not be correctly interpreted by the fake base station.

According to certain example embodiments, the standard cell search procedure may be modified in order to continue cell search procedure in case of missing or misleading content in PSS/SSS, MIB/SIBS and SIB2 RACH configuration to enable connection for the authorized UE. In the case of a regular or hostile UE, which may be not aware about inserted modification and which may not have CCCP TAU data, or its updated version, i.e., as shown in the examples of FIG. 6 and FIG. 8, the cell search procedure should be aborted. In case of the authorized UE, e.g., as shown in the example of FIG. 7, cell search procedure should be supported by the valid CCCP TAU data scope, which may contain data related to applied security level (i.e., Security Levels 3, 2, or 1). In an embodiment, the authorized UE may identify applicable CCCP TAU data by association with detected signal frequency, e.g. 810 MHz, or by connection with agreed broadcasted or transmitted openly cell parameter, e.g. PCI=0. In this context, each cell configuration parameters received in cell broadcast and synchronization transmissions may be assessed with respect to CCCP TAU content.

As an example, if broadcasted MIB system BW indicates value 5 MHz, Table 1 (column Security Level 2), the authorized UE may check whether in the given CCCP TAU there is corresponding system BW value, which in this case may indicate 20 MHz, Table 2 (column CCCP for Level 2). In this case, for further decoding, the authorized UE may use the value from CCCP TAU. If CCCP TAU contains offset to the received broadcast value, e.g., SFN (same table), the authorized UE should offset indicated value by the CCCP TAU stored factor, e.g., received SFN=300 (Table 1, column Security Level 2), CCCP TAU SFN Offset=+200, Table 2 (column CCCP for Security Level 2), thus the correct SFN=300+200=500. If CCCP TAU does not contain associated cell parameter, i.e., no direct value or offset, then it may be assumed that received cell configuration parameter should be applied directly. If CCCP TAU does not contain associated cell parameter but cell broadcast or synchronization transmission also do not contain this value, or the stored CCCP TAU value is not correct, the cell search procedure should be aborted similar to the standard way.

Referring again to the example of FIG. 2, it may be assumed that the base station gNB1 may be configured to apply security level 3, 2 or 1, respectively, and the authorized UE may be aware about the security level set. Table 1 and Table 2 present example of cell configuration parameters, which may be used by the base station and which may be provided as CCCP data to the authorized UE. Reference NB may refer to traditional cell, which may broadcast or transmit all required cell data.

In case of some parameters, some value from the supported range may need to be always set. In such a case, a default value may be considered. In other cases, the value may not be available (noise floor) or some misleading parameter may be set or the provided value may be offset to the real value.

In this context, when security level 3 is set, which is the lowest protection according to certain embodiments, the scope of RACH configuration may be modified. In this example, a value for rootSequenceindex may not be indicated by the base station (N/A or Default). As a result, the unauthorized UE may not establish connection, the hostile UE may try to guess this missing parameter and the authorized UE may take this value from the corresponding CCCP field (22) stored inside its memory.

Similarly, in case of security level 2, which may be considered as medium level of protection according to certain embodiments, the scope of MIB/SIBs may be modified. In this context, the base station may broadcast different system BW data and SFN with offset (HFN may be also shifted). As a result, the unauthorized UE may not be able to correctly decode the scope of transmissions and the hostile UE may need to apply a trial and error approach to determine the correct configuration. Meanwhile, the authorized UE may be aware that received system BW value (5 MHz) should be rejected and CCCP originated value (20 MHz) should be used, and that the received SFN value (300) and offset +200 should be added.

tions, the scope of PSS/SSS may be altered such a way that a different PCI value (0) may be signaled by the base station. As a result, the unauthorized UE may not be able to correctly decode the scope of transmissions and the hostile UE may need to apply a trial and error approach to determine the correct configuration, which may be much more complicated. Meanwhile, the authorized UE may be aware that to received Cell Number value (0) an offset +1 needs to be set and instead of received Cell Group Number value (0), CCCP provided value should be used instead (100). Thus, by sum of columns in Table 1 and Table 2, a correct value may be received, which should correspond to value provided in Reference NB.

Figure 9:
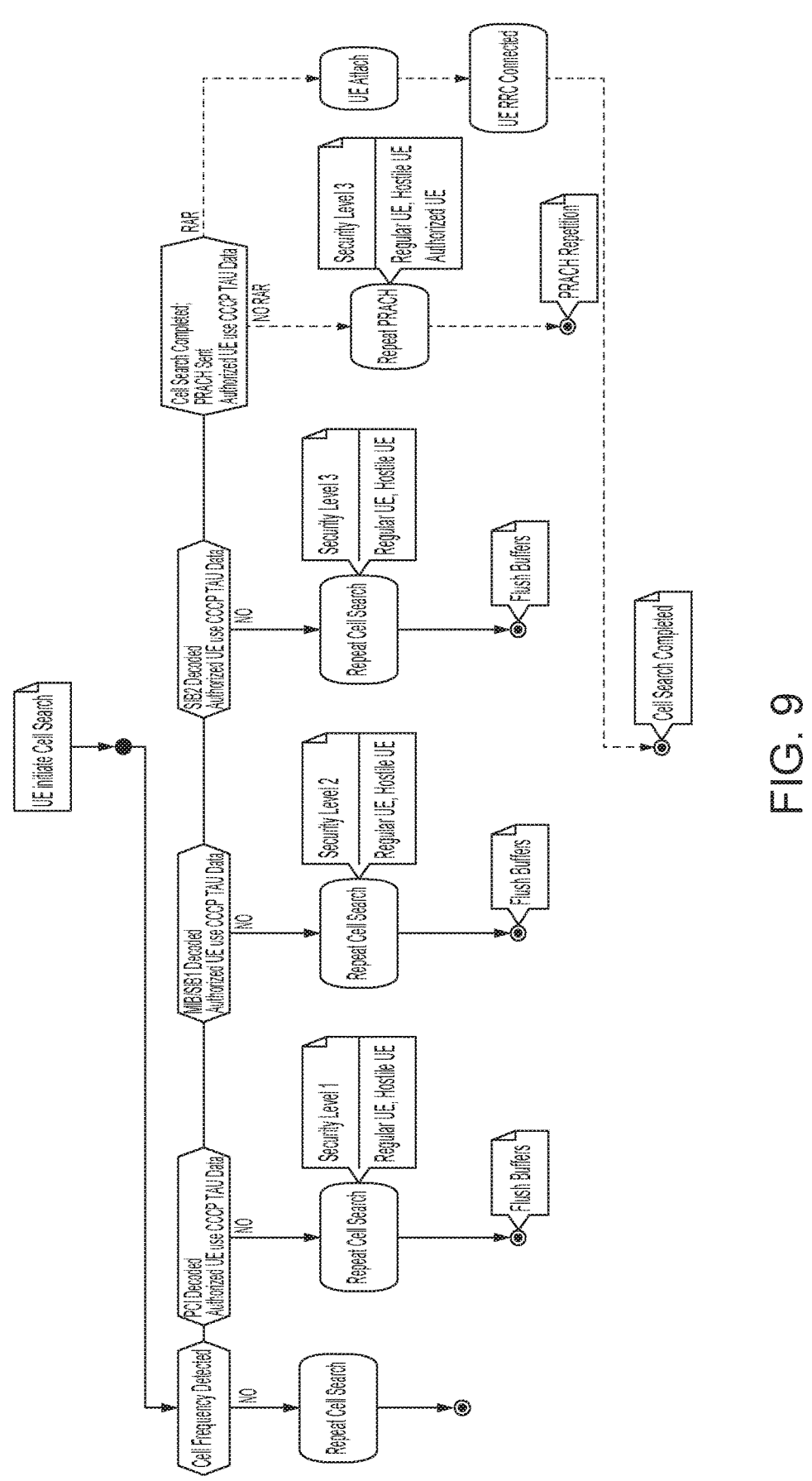
FIG. 9 illustrates an example of a cell search procedure, according to an embodiment.

FIG. 9 illustrates an example of a modified cell search procedure that may be applied according to certain embodiments. As illustrated in the example of FIG. 9, the authorized UE, which may be provided with valid CCCP TAU data, may be able to supplement any cell configuration missing or incorrect content, thus the Cell Search procedure may be ongoing. Additionally, the authorized UE may be able to switch from RRC Idle to RRC Connected state, which may be considered as a final verification of whether the correct cell configuration was used. The authorized UE may also stay in RRC Idle state and use other services accordingly. Further, in an embodiment, a regular UE may abort the current cell search procedure if it is not able to correctly decode the content or if received cell configuration is incorrect. Thus, rejection may be expected at different

TABLE 1

Security Levels at the authorized base station

| gNB/eNB TX | Reference NB | Security Level 3 | Security Level 2 | Security Level 1 |
|---|---|---|---|---|
| Layer 1 PSS/SSS | Cell Number = 1 Cell Group Number = 100 (PCI = 301) | Cell Number = 1 Cell Group Number = 100 (PCI = 301) | Cell Number = 1 Cell Group Number = 100 (PCI = 301) | Cell Number = 0 Cell Group Number = 0 (PCI = 0) |
| Layer 2 MIB/SIBs | System BW = 20 MHz, SFN = 500, | System BW = 20 MHz, SFN = 500, | System BW = 5 MHz, SFN = 300, | System BW = 5 MHz, SFN = 300, |
| Layer 3 RACH | RACH Config Common: rootSequenceindex = 22 | RACH Config Common: rootSequenceindex = N/A or Default | RACH Config Common: rootSequenceindex = N/A or Default | RACH Config Common: rootSequenceindex = N/A or Default |

TABLE 2

Scope of Coded Cell Configuration Package at the authorized UE side

| UE RX | Reference NB | CCCP for Level 3 | CCCP for Level 2 | CCCP for Level 1 |
|---|---|---|---|---|
| Layer 1 PSS/SSS | Cell Number = 1 Cell Group Number = 100 (PCI = 301) | | | Cell Number = +1 Cell Group Number = 100 |
| Layer 2 MIB/SIBs | System BW = 20 MHz, SFN = 500, | | System BW = 20 MHz, SFN = +200, | System BW = 20 MHz, SFN = +200, |
| Layer 3 RACH | RACH Config Common: rootSequenceindex = 22 | RACH Config Common: rootSequenceindex = 22 | RACH Config Common: rootSequenceindex = 22 | RACH Config Common: rootSequenceindex = 22 |

It is noted that: PCI=3×CGN+CN [Eq. 1], where PCI is Physical Cell Identifier, CGN is Cell Group Number, and CN is Cell Number.

Consequently, in case of security level 1, which may be considered as high level of protection according to certain embodiments, apart from security level 3 and 2 modificastage(s) of the cell search procedure. In case of a hostile UE, it may be assumed that it would apply a trial and error approach. Thus, possible cell search abort may happen at different stage(s) of the procedure.

When considering CCCP update in RRC Connected state, TAU model may be applied, in which CCCP may contain data corresponding to a group of cells, which applies enhanced security level operations. Thus, the authorized UE may receive CCCP TAU update to handle its mobility. CCCP data may contain packages with different settings depending on requested security level.

It should also be noted that the given secure cell configuration may be applied according to clearly specified time frames, e.g., from HH:MM:SS:MS:US to HH+10:MM:SS:MS:US, or due to reception of clearly specified trigger over the radio interface, which may be for example specified cell configuration signalled as regular cell transmission, e.g. PCI=0. Different CCCP TAU data set may be activated by different triggers, which may enable silent activation of example embodiments.

CCCP TAU data may contain sensitive cell configuration parameters, which makes it preferable that the storing and/or distribution of this data needs to be performed in a secure manner. In an embodiment, CCCP TAU data itself may be coded with a security key, for example a 128-bit key, which may be known for the given base station and for the authorized UE. According to some embodiments, data related to each base station may be coded with different keys. It also should be noted that, in safety and security related 5G/LTE networks, a user may be responsible for secure storage and usage of a UE, which prevents from revealing sensitive data to untrusted sites.

As an additional security enhancement, it may be assumed that CCCP TAU content may be permanently removed when unauthorized access to UE is detected, for example in case of multiple false credential entries or when a UE case is opened. In a variant, CCCP TAU content in such a situation may be replaced by clearly defined fake configuration, which may reveal for operators whether the given UE was lost and used against the communication infrastructure. As an example, this may include specific RACH configuration, which may be rejected but it may provide insight that the given UE may be considered as a defector or was lost.

Nevertheless, in safety and security 5G/LTE applications, it may be also assumed that the given UE may be lost or may be stolen. In such a case, the user should report this security breach, or such security breach may be assumed if user status in not known. It may be assumed that user and UE may be blocked at UE Attach or another level, when UE credential may be verified. Additionally, the network operator may initiate CCCP TAU update, when new cell configuration may be provided and may be effective from the given point of time. Thus, even in such a situation, certain embodiments can ensure an adequate level of security.

It may be anticipated that if more cell parameters are not provided by broadcasts or synchronization transmissions, a hostile UE, such as UE3 in the examples of FIG. 1 or 2, may have more problems in determining the correct cell configuration in order to efficiently block or interfere with uplink and downlink transmission between authorized UEs and authorized base stations. This means that the number of modified parameters may be used as a first factor.

It may be also assumed that a regular unauthorized UE, which just detects cell signals may reject this cell due to problems with decoding. Apart from the number of missing or misleading parameters, also given parameter maximum value range may be taken into account, for example for LTE: SFN (0-1023): 1024 values, PCI (0-503): 504 values, System BW (1.5, 3, 5, 10, 15, 20): 6 values. In this context, value ranges may be considered as a second factor.

A third factor may be related to the time value at which RACH procedure may be aborted. In this context, success in RACH may be interpreted as the cell configuration parameters being correctly applied, thus access to at least some services may be granted.

If the hostile UE is not aware of cell parameters modifications or such parameters are not provided to this hostile UE, the hostile UE may need to apply a trial and error approach. In such case, the hostile UE may attempt to decode the given cell correct configuration by using different values for PSS/SSS, MIB/SIBs and RACH Configuration decoding.

In order to determine the strength of certain embodiments in resisting unauthorized access, it may be possible to calculate a maximum time needed for the correct cell configuration decoding, denoted as Detection Time for specified Security Level ($DT_{SL}$) in [Eq 2] below. In an embodiment, $DT_{SL}$ may be a function of the number of altered parameters, their value ranges and times required for reattempts, as follows:

$$DT_{SL}(n, R_n, t_{SL}) = t_{SL}\Pi_{i=1}{}^{n}R_i \qquad \text{[Eq.2]},$$

where $DT_{SL}$ is the cell proper configuration detection time, n is the number of missing or misleading parameters at the given Security Level, $R_n$ is the given parameter maximum value range, and $t_{SL}$ is the mean reattempt time in case of failed parameter value decoding at the given Security Level.

Further, the strength of certain embodiments in preventing or resisting unauthorized access may be also expressed in probabilistic form by Detection Probability for specified Security Level ($DP_{SL}$), according to [Eq. 3] below:

$$DP_{SL}(n, R_n) = \frac{1}{\prod_{i=1}^{n} R_i}, \qquad \text{[Eq. 3]}$$

where $DP_{SL}$ is the probability for cell proper configuration detection, n is the number of missing or misleading parameters, and $R_n$ is the given parameter maximum value range.

In one example embodiment, for unauthorized regular UE, missing parameter(s) may be a preferred way to force cell reselection, as without such a parameter a regular UE may not be able to proceed further.

As an example for purposes of illustration, according to 3GPP TS 36.211 Table 5.7.2-4, RACH configuration parameter rootSequenceindex, which may be related to Security Level 3, may have values from 0 to 837 for Format 0 to 3, which means 838 possible values; this is $R_n$. If it is assumed that just this parameter is missing (N/A), may have misleading character or is set to default value, then n=1. It may be also assumed that mean reattempt time $t_{SL}$ may be the same each time, and as it is directly related to RACH, it may mean that a UE may send PRACH and wait for corresponding RAR (in the fourth (4th) subframe counting from PRACH subframe). For the purpose of illustration, as one example, $t_{SL3}$ specific for Security Level 3 may be set to 200 ms as the UE may need to repeat the entire procedure. With this data, $DT_{SL3}$ from [Eq. 2] and $DP_{SL3}$ from [Eq. 3], which refers to Security Level 3 may be equal to the following:

$$DT_{SL3}(1, R_1, t_{SL3}) = 200*838 = 167\ 600\ [\text{ms}] = 167.6\ [\text{s}]$$

$$DP_{SL3}(1, R_1) = 1/838 = 0,001193$$

It is noted that calculation of the above $DT_{SL3}$ and $DP_{SL3}$ are correct with the assumption that the hostile UE correctly anticipates which cell configuration parameter is missing.

In this case, the hostile UE may set rootSequenceindex=0 and then send PRACH. If No RAR is received, the hostile UE may repeat procedure with rootSequenceindex=1 and so on. If the correct value was 837, as in the example above, the hostile UE may need to repeat this procedure 838 times.

If there may be two missing or misleading parameters in RACH Configuration, i.e., n=2, and, e.g., zeroCorrelation-ZoneConfig which according to 3GPP TS 36.211 Table 5.7.2-2, may have values from 0 to 15, meaning range 16, and $t_{SL3}$ may be the same, $DT_{SL3}$ ([Eq. 2]) and $DP_{SL3}$ from [Eq. 3], which refers to Security Level 3 may be equal to the following:

$$DT_{SL3}(2,R_2,t_{SL3})=200*838*16=2\ 681\ 600\ [ms]=2\ 681.6\ [s]=44.69\ [min]$$

$$DP_{SL3}(2,R_2)=1/838*16=0,000075$$

It is noted that calculation of the above $DT_{SL3}$ and $DP_{SL3}$ are correct with the assumption that the hostile UE correctly anticipates which cell configuration parameters are missing.

In this case, the hostile UE may set rootSequenceindex=0 and set zeroCorrelationZoneConfig=0 and then send PRACH. If No RAR is received, the hostile UE may repeat procedure with rootSequenceindex=0 and zeroCorrelation-ZoneConfig=1 and so on. If configuration rootSequencein-dex=0 and zeroCorrelationZoneConfig=15 still is not correct, the hostile UE may set rootSequenceindex=1 and set zeroCorrelationZoneConfig=0 and continue until rootSe-quenceindex=837 and set zeroCorrelationZoneConfig=15, which may be the correct configuration.

As illustrated above, however, a significant number of PRACHs without corresponding RARs may be required in order for the hostile UE to determine the correct cell configuration, which in turn may enable further connection attempts. This provides the network operator with the opportunity to detect such RACH performance degradation and to correlate it with a possible attack on infrastructure. If RAR is received, then it means that the hostile UE applies correct cell configuration.

In an embodiment, when considering Security Level 2, the general approach may be similar with respect to $DT_{SL}$ ([Eq. 2]) and $DP_{SL}$ ([Eq. 3]), but a different reattempt time $t_{SL2}$ specific for Security Level 2 may be considered. If MIB/SIBs may not be correctly detected, especially SIB1, the hostile UE may be provided with incorrect RACH data due to improper decoding issue. This time may be shorter than $t_{SL3}$ for Security Level 3 if decoding completely fails at this level. As an example for purposes illustration, $t_{SL2}$ may be set to 80 ms, which may be related to SIB2 periodicity.

In an embodiment, the misleading parameter at Security Level 2 may be forwarded to Security Level 3. The hostile UE may start random access procedure with incorrect entry data, which means that even if the hostile UE checks all possible cell parameter configurations by trial and error, a connection might still not be established.

According to an embodiment, when considering Security Level 1, this also may be characterized by specific reattempt time $t_{SL1}$. This time may be also shorter than $t_{SL2}$ for Security Level 2 if decoding completely fails at this level. As an example for purposes of illustration, $t_{SL1}$ could be set to 40 ms, which may be related to SSS periodicity.

In an embodiment, the misleading parameter at Security Level 1 may be forwarded to Security Level 2 and also to Security Level 3. Thus, the hostile UE may start random access procedure with wrong entry data. It means that even if all possible cell parameters configuration is checked by trial and error method, still connection may not be established.

It is noted that, in some situations, problems with correct information decoding at PSS/SSS and MIB/SIBs, especially SIB1 level, may prevent from continuing with the given procedure, which may mean PRACH might not be sent. This in turns may have impact on $DT_{SL}$ and $DP_{SL}$ calculations specific for the given Security Level.

Once example embodiments are applied, the hostile UE may not be sure whether received cell configuration param-eters are correct or not, as they may have purposefully misleading character, which may be used in order to further complicate any potential hostile actions, as illustrated in the example of FIG. 1 for UE3.

As one example, LTE SIB2 RACH Config Common may contain 11 parameters of different values and ranges and PRACH Config may contain 5 parameters of different values and ranges. The hostile UE may not be able to determine which cell configuration parameter may have misleading character, which means any of them may be subject to trial and error checking by the hostile UE. Therefore, in this example, when considering Security Level 3, up to 16 parameters may be subject to trial and error checking.

Consequently, the hostile UE may need to apply correc-tions in $DT_{SL}$ ([Eq. 2]) and $DP_{SL}$([Eq. 3]) calculations for the specified Security Level, as every received cell configura-tion parameter may be considered as misleading or incorrect. Thus, $DT_{SL}$ and $DP_{SL}$ at the given Security Level may require modifications to according to [Eq. 2a] for $DT_{SL}$ and [Eq. 3a] for $DP_{SL}$ as in the following:

$$DT_{SL}(N, R_N, t_{SL}) = t_{SL}\prod\nolimits_{i=1}^{N} R_i \qquad \text{[Eq. 2a]}$$

$$DP_{SL}(N, R_N) = \frac{1}{\prod\nolimits_{i=1}^{N} R_i}, \qquad \text{[Eq. 3a]}$$

where N is all cell parameters at the given Security Level.

As might be anticipated, using $DT_{SL}$ according to [Eq. 2a] and $DP_{SL}$ according to [Eq. 3a], it may be possible to wait a very long time for correct cell configuration detection with a very small probability that this effort may be successful at the given Security Level. In addition, a network operator may detect such efforts based on incorrect PRACHs recep-tion and may apply countermeasures if required, such as to initiate CCCP TAU change or identify and localize the hostile UE in the coverage, e.g., as shown in the example of FIG. 2.

Considering that cell configuration parameters may have misleading character or may not be present at any Security Level, total Detection Time $DT_T$ [Eq. 4] and total Detection Probability $DP_T$ [Eq. 5] may be expressed as the following:

$$DT_T = DT_{SL1} + DT_{SL2} + DT_{SL3} \qquad \text{[Eq. 4]}$$

$$DP_T = DP_{SL1} * DP_{SL2} * DP_{SL3} \qquad \text{[Eq. 5]},$$

Where $DT_{SL1}$, $DT_{SL2}$, $DT_{SL3}$ corresponds to detection times at Security Level 1, Security Level 2 and Security Level 3, and $DP_{SL1}$, $DP_{SL2}$, $DP_{SL3}$ corresponds to detection probabili-ties at Security Level 1, Security Level 2 and Security Level 3 accordingly.

FIG. 10A illustrates an example flow chart of a method for securely providing cell configuration parameters, according to one embodiment. In certain example embodiments, the flow diagram of FIG. 10A may be performed by a network entity or network node in a communications system, such as LTE or 5G NR. In some example embodiments, the network entity performing the method of FIG. 10A may include or be included in a base station, access node, node B, eNB, gNB, NG RAN node, or the like. For instance, in one example embodiment, the method of FIG. 10A may be performed by a gNB, such as the gNB(s) depicted in the examples of FIGS. 1-2 or 4-8 discussed above.

As illustrated in the example of FIG. 10A, the method may include, 1100, providing or delivering cell configuration or other cell sensitive data or parameters to an authorized UE. For example, the providing 1100 may include providing the cell configuration or other cell sensitive data directly to the memory of the authorized UE as CCCP TAU data during configuration of the authorized UE. Additionally or alternatively, the providing 1100 may include providing the cell configuration or other cell sensitive data to the memory of the authorized UE as CCCP TAU data while the authorized UE is in RRC connected state with a network node or gNB.

In one embodiment, the cell configuration or other cell sensitive data may include static cell parameters and/or dynamic cell parameters, which can be stored in separate forms. For instance, in one embodiment, static cell parameters in the CCCP TAU may be stored in direct and/or coded form. Meanwhile, in an embodiment, the dynamic cell parameters may be stored in CCCP TAU as an offset and/or in coded form. In some embodiments, when the cell configuration or other cell sensitive data is provided while the authorized UE is in RRC connected state with the network node, the CCCP TAU data may be encrypted or coded with a security key.

According to an embodiment, the method of FIG. 10A may include, at 1105, sending cellular configuration signals, such as the broadcasting of MIB and/or SIB or the transmitting of PSS and/or SSS, that include false cell static parameters or missing cell static parameters. As a result of the false or missing cell parameters, a UE receiving the MIB/SIB or PSS/SS would not be able to properly decode cell signals and may instead select another cell for connection. Accordingly, any potential hostile UE would not be provided with actual cell configuration data and would be prevented from disrupting communications, e.g., via jamming or acting as a fake base station.

In certain embodiments, the CCCP TAU data may be associated with a first security level (Security Level 1) corresponding to layer 1 PSS or SSS, may be associated with a second security level (Security Level 2) corresponding to layer 2 MIB or SIB, or may be associated with a third security level (Security Level 3) corresponding to random access channel configuration.

As introduced above, Security Level 1, which can provide the highest level of security according to certain embodiments, may correspond to layer 1 (PSS/SSS) and may be applied, for example, in the case of high security and safety related private networks, such as government and military applications. According to Security Level 1, the PSS/SSS cannot be decoded by a UE or may provide a misleading parameter value to the UE, which prevents the UE from properly decoding other cell parameters. As a result, such a cell may be rejected. However, in a case where misleading or false parameters are being provided, default parameters may be provided across the network. As one example, assuming the relevant parameter is PCI, then there could be a possibility that some neighbour cell may have the same PCI set and, thus, there may be a risk of interference. In such a case, a default PCI may be used cross the network and the UE(s) may determine the correct PCI after association with the given detected signal frequency. In certain embodiments, under Security Level 1, CCCP TAU may contain Layer 3, Layer 2 and/or Layer 1 content accordingly. This solution may have impact on other cells in the vicinity due to possible PCI collision.

According to an embodiment, Security Level 2, which can provide a medium or middle level of security according to certain embodiments, may correspond to Layer 2 (MIB/SIBs) and may be applied, for example, in case of 5G/LTE safety and security related private networks applications or for government applications. According to Security Level 2, the MIB/SIB content cannot be correctly decoded by any regular or unauthorized UEs and hostile UEs may instead attempt to apply a trial and error approach to guess or predict the correct cell configuration. As such, access to RRC Idle services may not be granted. In certain embodiments, under Security Level 2, CCCP TAU may contain Layer 3 and/or Layer 2 content. Since MIBs/SIBs can be cell specific, this approach should have no impact on other cells in the vicinity.

In an embodiment, Security Level 3, which can provide the lowest level of security when compared to Security Level 1 or 2, may correspond to Layer 3 (RACH Configuration) and can be applied, for example, in general 5G/LTE private networks to prevent from unauthorized access. According to Security Level 3, a regular UE may not be able to decode RACH Configuration from SIB2 so it may not initiate connection by sending PRACH to this cell; however, other services available in RRC Idle state may be granted. In certain embodiments, under Security Level 3, CCCP TAU may contain Layer 3 content. Since RACH configuration is cell specific, this approach should have no impact on other cells in the vicinity.

FIG. 10B illustrates an example flow diagram of a method relating to securely receiving or obtaining cell configuration parameters, according to an example embodiment. In some example embodiments, the method of FIG. 10B may be performed by a network node or element, such as a UE, mobile station, mobile device, mobile unit, mobile equipment, user device, subscriber station, wireless terminal, tablet, smart phone, stationary device, IoT device, NB-IoT device, sensor, and/or other device. For instance, in an embodiment, the method of FIG. 10B may be performed by an authorized UE As illustrated in the example of FIG. 10B, the method may include, 1120, storing cell configuration or other cell sensitive data received from a network node in the memory of the authorized UE as CCCP TAU data. In an embodiment, the storing 1120 may include storing the cell configuration or other cell sensitive data as CCCP TAU data in the memory during configuration of the authorized UE. Additionally or alternatively, in an embodiment, the storing 1120 may include storing the cell configuration or other cell sensitive data as CCCP TAU data in the memory while the authorized UE is in RRC Connected state with the network node.

In one embodiment, the cell configuration or other cell sensitive data may include static cell parameters and/or dynamic cell parameters, which can be stored in separate forms. For instance, in one embodiment, static cell parameters in the CCCP TAU may be stored in direct and/or coded form. Meanwhile, in an embodiment, the dynamic cell parameters may be stored in CCCP TAU as an offset and/or in coded form. In some embodiments, when the cell configuration or other cell sensitive data is provided while the authorized UE is in RRC Connected state with the network node, the CCCP TAU data may be encrypted or coded with a security key.

According to certain embodiments, the method of FIG. 10B may include, at 1122, receiving, from the network node, cellular configuration signals, such as MIB/SIB and/or PSS/SSS that may include false cell static parameters or missing cell static parameters. In an embodiment, the method may include, at 1124, attempting to decode detected cell signals using parameters received in the MIB/SIB and/or PSS/SSS. However, since the MIB/SIB and/or PSS/SSS may include false or missing cell parameters, the UE may not be able to properly decode the cell signals. In this case, when the attempt to decode is not successful, the method may include, at 1126, searching the CCCP TAU data stored in the memory for the cell configuration data or other cell sensitive data and, at 1128, decoding the detected cells using the cell configuration data or other cell sensitive data stored in the memory. In one example embodiment, the decoding 1128 may include using the stored CCCP TAU data to modify or supplement the received MIB/SIB and/or PSS/SSS content, which may include false or missing parameters, in order to decode the detected cell signals.

As discussed in detail above, in certain embodiments, the CCCP TAU data may be associated with a first security level (Security Level 1) corresponding to layer 1 PSS or SSS, may be associated with a second security level (Security Level 2) corresponding to layer 2 MIB or SIB, or may be associated with a third security level (Security Level 3) corresponding to random access channel configuration.

Figures 11A, 11B:
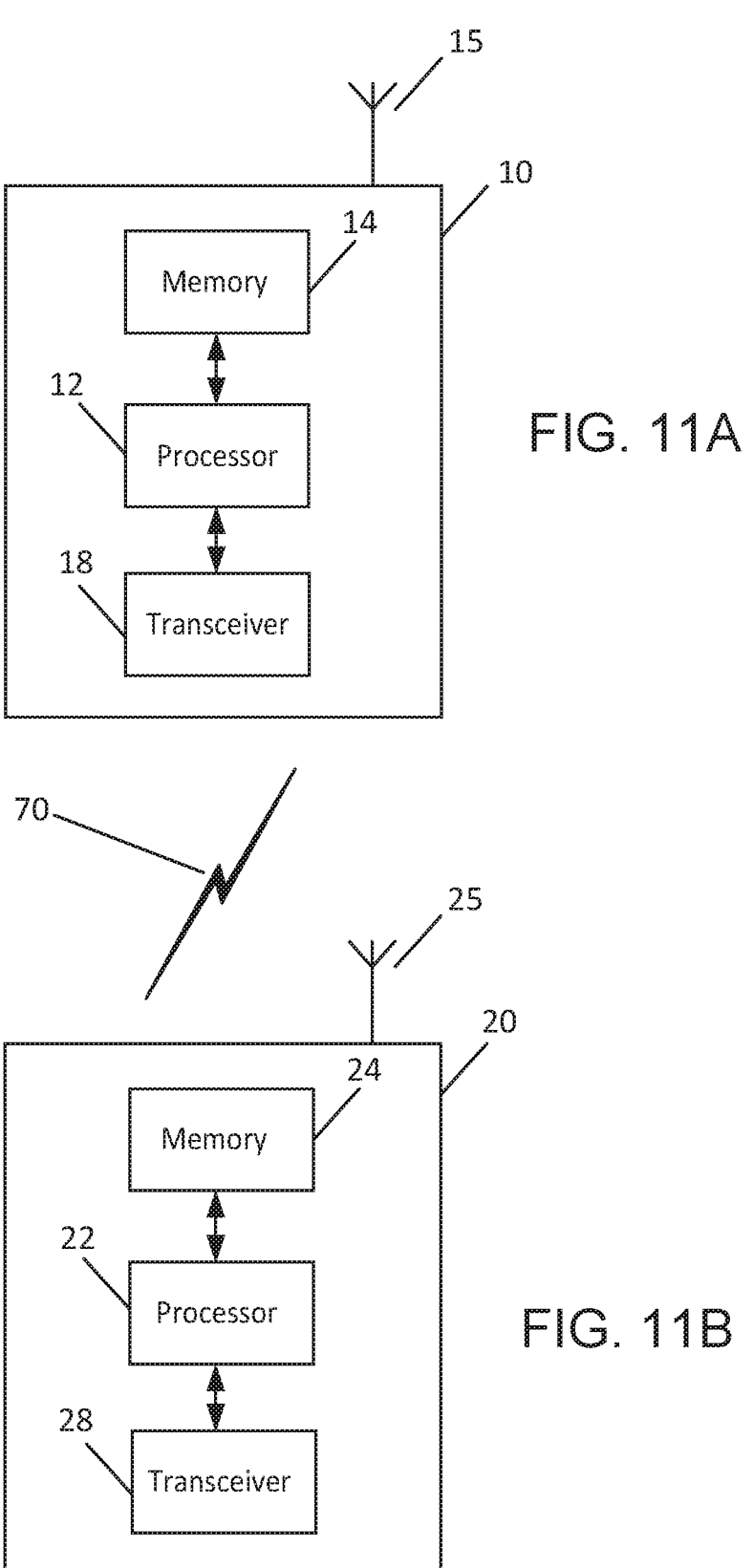
FIG. 11A illustrates an example block diagram of an apparatus, according to an embodiment.
FIG. 11B illustrates an example block diagram of an apparatus, according to an embodiment.

FIG. 11A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 11A.

As illustrated in the example of FIG. 11A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as some operations associated with or described with respect to any of the gNB(s), depicted in FIGS. 1-2 or 4-8. In particular, according to an embodiment, apparatus 10 may be controlled to perform a process relating to securely providing cell parameters. For instance, apparatus 10 may be controlled by memory 14 and processor 12 to perform at least the method of FIG. 10A or any other method described herein.

FIG. 11B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 11B.

As illustrated in the example of FIG. 11B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. In an embodiment, apparatus 20 may be controlled to perform a process relating to securely obtaining or receiving cell parameters from a network node. According to certain embodiments, apparatus 20 may be controlled by memory 24 and processor 22 to perform the functions associated with any of the embodiments described herein, such as one or more of the operations illustrated in, or described with respect to, FIG. 10B or any other method described herein.

In some embodiments, an apparatus (e.g., apparatus 10 and/or apparatus 20) may include means for performing a method or any of the variants discussed herein, such as the methods 12 described with reference to FIGS. 10A and 10B. Examples of the means may include one or more processors, memory, and/or computer program code for causing the performance of the operation.

In view of the foregoing, certain example embodiments provide several technological improvements, enhancements, and/or advantages over existing technological processes and constitute an improvement at least to the technological field of wireless network control and management. For example, as discussed in detail in the foregoing, certain example embodiments provide systems and methods that prevent and/or avoid the detection of cell configuration parameters by possible hostile actors that could use the parameters against 5G/LTE infrastructure or other communications infrastructure. For example some embodiments, which may be denoted as zero trust cell broadcast(s), may improve network security, such as in the case of safety and security 5G/LTE private networks, government and military applications, by providing cell configuration data by other ways. For example, an embodiment may provide for directly downloading this data to the internal memory of authorized UE(s) as CCCP TAU data or by delivering this data when a UE is in RRC Connected state. In an example embodiment, the provided data may be encrypted and/or coded. Thus, example embodiments can improve security aspects at least for sensitive 5G/LTE infrastructure. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:

at least one processor; and at least one non-transitory memory storing instructions that, when executed by the at least one processor, cause the apparatus at least to:

provide cell configuration or other cell sensitive data to an authorized user equipment, wherein, to provide the cell configuration or other cell sensitive data, the apparatus is further caused to provide the cell configuration or other cell sensitive data to a memory of the authorized user equipment as coded cell configuration package tracking area update data during configuration of the authorized user equipment or while the authorized user equipment is in radio resource control connected state with the apparatus; and broadcast cell configuration information comprising altered cell parameters including false cell static or dynamic parameters or missing cell static parameters or offset from a real value of a parameter, wherein a maximum time needed to decode a correct cell configuration is a function of the number of the altered cell parameters and is calculated according to the following:

$$DT_{SL}(n, R_n, t_{SL}) = t_{SL} \Pi_{i=1}^{n} R_i,$$

where $DT_{SL}$ is a cell proper configuration detection time, n is a number of the altered cell parameters at a given security level, $R_n$ is a parameter maximum value range, and $t_{SL}$ is a mean reattempt time in case of failed parameter value decoding at the given security level.

2. The apparatus according to claim 1, wherein the cell configuration information comprises at least one of a master information block, a system information block, or a primary synchronization signal or a secondary synchronization signal.

3. The apparatus according to claim 1, wherein the coded cell configuration package tracking area update data is configured to be applied based on a signaling trigger or by a given time.

* * * * *